US008336052B2

(12) United States Patent  
Sharoff et al.

(10) Patent No.: US 8,336,052 B2
(45) Date of Patent: Dec. 18, 2012

(54) MANAGEMENT, CONTROL, AND MONITORING OF WORKLOAD INCLUDING UNRELATED PROCESSES OF DIFFERENT CONTAINERS

(75) Inventors: Narasimha N. Sharoff, Beaverton, OR (US); Vivek Kashyap, Beaverton, OR (US); Chandrasekhara Seetharaman, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 12/140,178

(22) Filed: Jun. 16, 2008

(65) Prior Publication Data

US 2009/0313625 A1 Dec. 17, 2009

(51) Int. Cl.
*G06F 9/46* (2006.01)
(52) U.S. Cl. ........................................................ 718/102
(58) Field of Classification Search ........................ None
See application file for complete search history.

(56) References Cited

U.S. PATENT DOCUMENTS

| | | | |
|---|---|---|---|
| 6,591,262 B1 | 7/2003 | MacLellan et al. | |
| 6,782,410 B1 * | 8/2004 | Bhagat et al. | 709/201 |
| 6,907,607 B1 | 6/2005 | Mummert et al. | |
| 7,028,301 B2 | 4/2006 | Ding et al. | |
| 7,401,012 B1 * | 7/2008 | Bonebakker et al. | 703/2 |
| 2002/0091746 A1 | 7/2002 | Umberger et al. | |
| 2003/0233391 A1 | 12/2003 | Crawford, Jr. et al. | |
| 2004/0015977 A1 * | 1/2004 | Benke et al. | 718/105 |
| 2004/0117540 A1 | 6/2004 | Hahn et al. | |
| 2005/0216908 A1 * | 9/2005 | Keohane et al. | 717/174 |
| 2006/0026179 A1 | 2/2006 | Brown et al. | |
| 2007/0234365 A1 | 10/2007 | Savit | |
| 2008/0271030 A1 * | 10/2008 | Herington | 718/104 |

* cited by examiner

*Primary Examiner* — Emerson Puente
*Assistant Examiner* — Gregory Kessler
(74) *Attorney, Agent, or Firm* — Steven L. Bennett (57) ABSTRACT

A first computer program runs in user memory space of a computing environment, and a second computer program runs in kernel memory space of the computing environment. The first computer program determines processes that constitute a workload. The second computer program creates a workload identifier corresponding to the workload, and associates the processes with the workload identifier. The first computer program requests metrics regarding the workload. In response, the second computer program collects such metrics by collecting metrics regarding the processes that constitute the workload and that are associated with the workload identifier The second computer program reports the metrics regarding the workload to the first computer program.

17 Claims, 4 Drawing Sheets

MANAGEMENT, CONTROL, AND MONITORING OF WORKLOAD INCLUDING UNRELATED PROCESSES OF DIFFERENT CONTAINERS

FIELD OF THE INVENTION

The present invention relates generally to workloads, where a workload can encompass a number of processes running within a computing environment, and more specifically to managing, controlling, and monitoring such workloads on a workload-by-workload basis.

BACKGROUND OF THE INVENTION

A computer program typically spawns one or more processes. A process may be defined as a collection of computing instructions that is separably executed by a processor within a computing environment that usually includes physical memory. Furthermore, within the prior art, there is the concept of a container. A container may encompass or contain all the processes associated with a given computer program. To manage, control, and monitor processes, such functionality can be performed in relation to each individual process, or in relation to the processes encompassed by a given container that is associated with a particular computer program. This can be problematic when what is desired is to manage, control, and monitor groups of processes that are not encompassed by a container associated with a given computer program.

Furthermore, managing, controlling, and monitoring processes can be onerous. For example, it may be desirable to monitor a number of processes, in order to collect performance-related and other types of metrics regarding the processes. Such metrics may only be able to be obtained within kernel memory space, or kernel space, as opposed to user memory space, or user space. Physical memory is either virtually or logically divided into kernel space and user space, where kernel space is the portion of memory that is reserved for running the operating system kernel, kernel extensions, and some device drivers, while user space is where application computer programs are executed. The kernel is the central component of an operating system, and is typically responsible for the system's resources, such as memory and processor utilization.

Therefore, where metrics regarding a number of processes are desired, what may have to occur within the prior art is that a communication be sent from a computing program running in user space across the user space-kernel space boundary and into kernel space to obtain the desired metrics, on a process-by-process basis. For instance, if twenty processes are of interest, then twenty such requests may have to be issued across the user space-kernel space boundary—one request for each process of the workload. Sending communications across the user space-kernel space boundary, however, deleteriously affects the performance of the computing environment in question as a whole. That is, requests sent over the user space-kernel space boundary can be expensive in terms of the computing resources that such requests require.

For all of these reasons, therefore, there is a need for the present invention.

SUMMARY OF THE INVENTION

The present invention relates to managing, controlling, and monitoring workloads. A method of an embodiment of the invention determines a number of processes that constitute a workload, by a first computer program running in user memory space of a computing environment. A workload identifier corresponding to the workload is created, by a second computer program running in kernel memory space of the computing environment. The processes are associated with the workload identifier, by the second computer program running in the kernel memory space of the computing environment.

In response to a request by the first computer program running in the user memory space of the computing environment for metrics regarding the workload, the following is performed. First, the metrics regarding the workload are collected by collecting metrics regarding the processes that constitute the workload and that are associated with the workload identifier, by the second computer program running in the kernel memory space of the computing environment. Second, the metrics regarding the workload are reported from the second computer program running in the kernel memory space of the computing environment to the first computer program running in the user memory space of the computing environment.

A computing system of an embodiment of the invention includes one or more processors, memory divided into user memory space and kernel memory space, a number of processes executed by the processors, a first computer program running in the user memory space, and a second computer program running in the kernel memory space. The first computer program selects one or more of the processes that constitute a workload. The second computer program performs actions in relation to the processes that constitute the workload in response to requests from the first computer program.

An article of manufacture of an embodiment of the invention includes a tangible computer-readable medium and means in the medium. The tangible computer-readable medium may be a recordable data storage medium, or another type of tangible computer-readable medium. The means may be a collection of processor-executable instructions stored on and/or executed from the medium. The means is to perform a method. The method starts a first computer program in user memory space of a computing environment, and starts a second computer program in kernel memory space of the computing environment. The first computer program determines a number of processes that constitute a workload. The first computer program sends, for each process, a process identifier associated with the process to the second computer program. The second computer program creates a workload identifier corresponding to the workload and associates the process identifiers of the processes with the workload identifier.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
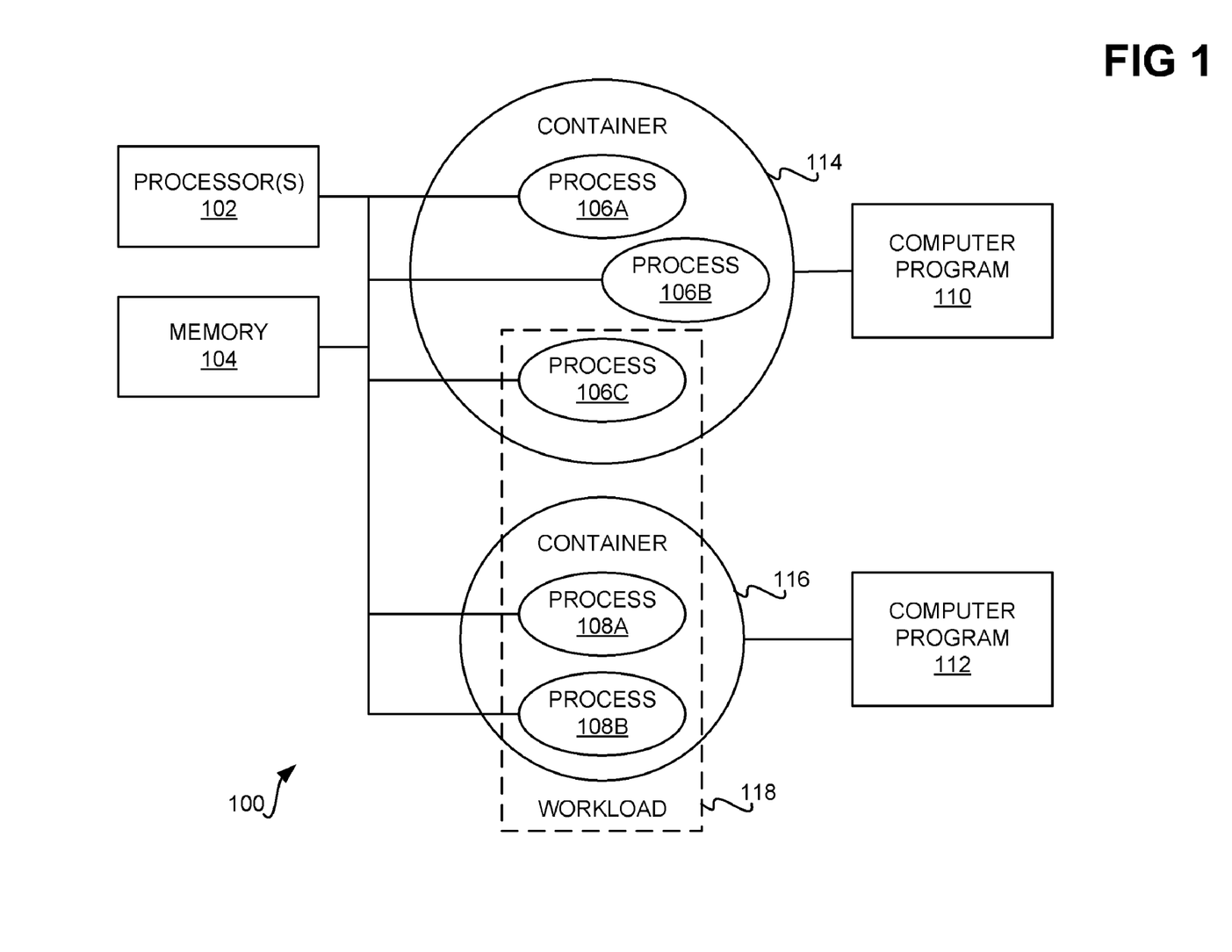
FIG. 1 is a diagram of a representatively exemplary computing environment having a workloads that a number of processes, according to an embodiment of the present invention.

FIG. 1 shows a representative exemplary computing environment 100, according to an embodiment of the invention. The computing environment 100 includes hardware, such as one or more processors 102 and memory 104, as well as software, such as the processes 106A, 106B, and 106C, collectively referred to as the processes 106, and the processes 108A and 108B, collectively referred to as the processes 108. The computing environment 100 may and typically does include other hardware, in addition to that depicted in FIG. 1, such as storage devices, input/output (I/O) devices, and so on.

In one embodiment, the processes 106 and 108 are executed by the processors 102, at least partially from the memory 104. As has been noted above, a process may be defined as a collection of computing instructions that is separably executed by a processor within a computing environment that usually includes physical memory. A process may also be referred to as a task.

In the computing environment of FIG. 1, the processes 106 are associated with a computer program 110. This means that execution of the computer program 110 actually implies execution of the processes 106. For instance, when the computer program 110 is executed, it may spawn the processes 106 at the same time or at different times, such that execution of the processes 106 as a whole realizes execution of the computer program 110. Likewise, the processes 108 are associated with a computer program 112.

The processes 106 of the computer program 110 are encompassed within a logical construct, also referred to as a container 114. Likewise, the processes 108 of the computer program 112 are encompassed within a container 116. A container is a logical construct that permits monitoring, control, and management-related actions to be performed in relation to all the processes encompassed by the container. However, a container is strictly defined in relation to and as corresponding to a particular computer program. Thus, where the processes 106 are associated with the computer program 110, and the processes 108 are associated with the computer program 112, then this means that the processes 106 cannot be part of the container 116 that contains the processes 108, and that the processes 108 cannot be part of the container 114 that contains the processes 106. A container isolates processes associated with a given computer program from other processes.

Also depicted in FIG. 1 is a representative workload 118. As compared to the containers 114 and 116, the workload 118 permits flexible inclusion of the processes 106 and 108 therein, irrespective of the computer programs 110 and 112 with which the processes 106 and 108 are associated. For example, the workload 118 encompasses the processes 106C, 108A, and 108B. That is, it is said that the processes 106C, 108A, and 108B constitute the workload 118.

A workload may be generally defined as any arbitrary grouping of one or more processes. Not all the processes currently being executed within the computing environment 100 have to be included in a workload. For example, in FIG. 1, the processes 106A and 106B are not part of the workload 118. A workload may be particularly defined in one embodiment as encompassing those processes that are associated with a particular workflow.

In one embodiment, a workflow is a representation of business logic, such that the implementation of the business logic by process(es) of computer program(s) achieves realization of the business logic. A workload is therefore the collection of processes that implement the business logic of a corresponding workflow. In the example workload 118. then, the workload 118 corresponds to a workflow that is implemented by the processes 106C, 108A, and 108B of the computer programs 110 and 112, and not the processes 106A and 106B of the computer program 110.

In another embodiment, a workload may be particularly defined as a collection of processes that satisfy a particular policy. One example of a policy specifies all processes that have a certain prefix in their process names. Another example of a policy specifies all processes associated with a given computer program or given computer programs. A third example of a policy specifies all processes associated with a particular workflow, in accordance with the definition of a workload in the previous paragraph.

Therefore, there are at least two salient points regarding the processes that constitute a workflow. First, some of the processes of the workload may be completely unrelated to other of the processes of the workload, at least in that they are associated with different computer programs. For example, the process 106C of the workload 118 is associated with the computer program 110, and thus is completely unrelated in this way to the processes 108A and 108B of the workload 118, which are instead associated with the computer program 112.

Second, some of the processes of the workload may be grouped in a different container than other of the processes of the workload. For example, the process 106C of the workload 118 is grouped within the container 114, whereas the processes 108A and 108B of the workload 118 are grouped within the container 116. Both of these points serve to denote the flexibility associated with the definition of a workload. The processes encompassed by a workload do not have to be related. A workload can also be defined across the boundaries of a container. It is noted that the processes contained by a container do not necessarily have to be related, because a container can be defined in any arbitrary manner in one embodiment of the invention.

Furthermore, a workload may dynamically encompass processes. In the example of FIG. 1, when the workload 118 is initially created, just the processes 106 and 108A may be currently executing. Therefore, at first the workload 118 includes the processes 106C and 108A. Thereafter, the computer program 112 may spawn the process 108B. Assuming that the process 108B satisfies the policy defining the workload 118, for example, the workload 118 at that time is also said to encompass the process 108B. That is, the definition of a workload is not static, but rather is dynamic, such that the processes that populate and constitute the workload can change as processes being executed and are executed.

Figure 2:
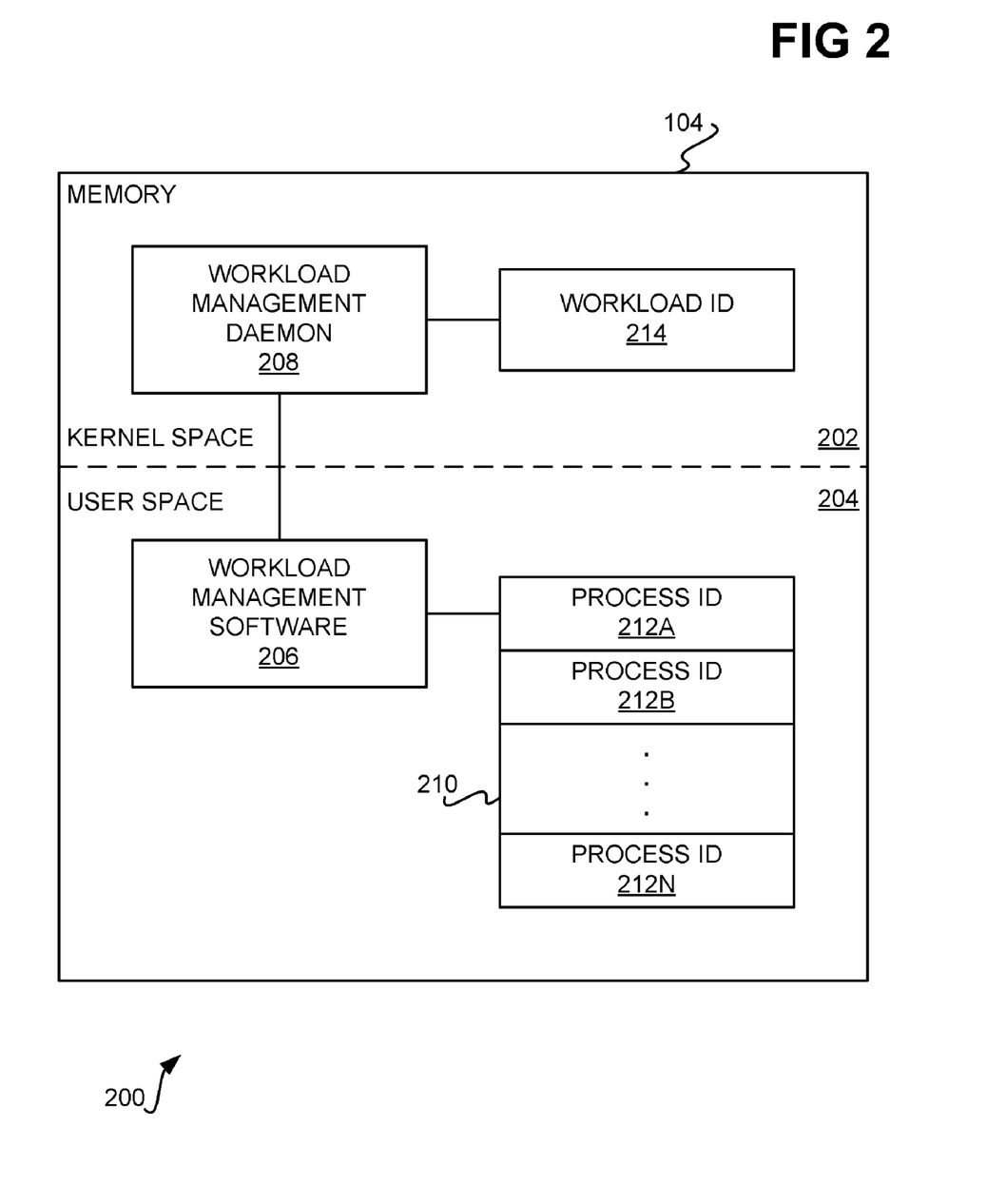
FIG. 2 is a diagram of a computing system for managing, controlling, and/or monitoring workloads in relation to the computing environment of FIG. 1, according to an embodiment of the present invention.

FIG. 2 is a diagram of a computing system 200 for managing, controlling, and monitoring workloads in relation to the computing environment 100 of FIG. 1, according to an embodiment. The computing system 200 is depicted in FIG. 2 as including workload management software 206 and a workload management daemon 208. The workload management software 206 may be more generally considered as a first computer program, while the workload management daemon 208 may be more generally considered as a second computer program.

Just the memory 104 of the computing environment 100 of FIG. 1 is specifically depicted as part of the computing system 200 in FIG. 2, for illustrative clarity and convenience. However, the computing system 200 can include the other components of the computing environment 100, such as the processors 102. Furthermore, the processes 106 and 108, the computer programs 110 and 112, and/or the containers 114 and 116 that are present in the computing environment 100 may also be present in the computing system 200. The computing system 200 is to large degree exemplarily described in relation to the workload 118 of FIG. 1 that encompasses the processes 106A, 108A, and 108B.

The memory 104 has been logically or virtually divided into a kernel space 202, which may also be referred to as kernel memory space, and a user space 204, which may be also referred to as user memory space. As has been described above, physical memory like the memory 104 is either virtually or logically divided into kernel space and user space, where kernel space is the portion of memory that is reserved for running the operational system kernel, kernel extensions, and some device drivers, while user space is where application computer programs are executed. The kernel is the central component of an operating system, and is typically responsible for the system's resources, such as memory and processor utilization.

The workload management software 206 is executed by the processors 102 of FIG. 1 specifically from the user space 204, such that it can be said that the workload management software 206 resides and runs within the user space 204. By comparison, the workload management daemon 208 is executed by the processors 102 specifically from the kernel space 202, such that it can be said that the workload management daemon 208 resides and runs within the kernel space 202. The workload management software 206 and the workload management daemon 208 can communicate with one another across the kernel space 202-user space 204 boundary, which is depicted in FIG. 2 by virtue of a line connecting the software 206 and the daemon 208.

The workload management software 206 determines which of the processes 106 and 108 of FIG. 1 constitute the workload 118. This determination can be made based on a policy, or in another manner, as has been described. Thereafter, the workload management software 206 creates an array 210 having a number of entries 212A, 212B, . . . , 212N, collectively referred to as the entries 212. Each of the entries 212 includes the process identifier, or ID, of one of the processes that constitute the workload in question. For example, as to the workload 118, there would be three entries 212, corresponding to the process identifiers of the processes 106C, 108A, and 108B.

The workload management software 206 passes the array 210 across the kernel space 202-user space 204 boundary to the workload management daemon 208. In response, the workload management daemon 208 creates a workload identifier, or ID, 214 that is associated with the workload defined by the array 210. The workload management daemon 208 may pass this workload identifier back to the workload management software 206, across the kernel space 202-user space 204 boundary, in one embodiment of the present invention.

Thereafter, the workload management software 206 may request that certain actions be performed in relation to the processes constituting the workload identified by the workload identifier 214. Such actions may be management- or control-related actions or they may be monitoring-related actions. A request for such an action to be performed is sent by the workload management software 206 across the kernel space 202-user space 204 boundary to the workload management daemon 208, which then performs the action, and which may report back results of performance of the action back to the software 206 across the kernel space 202-user space 204 boundary.

Thus, the workload management software 206 residing within the user space 204 is the computer program at which a workload is defined, and at which requests for performing actions in relation to the workload are generated. However, the actions themselves are performed by the workload management daemon 208 residing within the kernel space 202. This is advantageous, because some types of actions may only be able to be performed within the kernel space 202, as opposed to within the user space 204.

Examples of management- and control-related actions that can be performed in relation to the processes constituting a workload include stopping the processes, and lowering the priority of processor cycles that the processes receive, such that processor utilization is reduced. Examples of monitoring-related actions include collecting performance-related and other types of metrics associated with the execution of the processes constituting a workload. For instance, performance-related metrics can include how much memory the processes have allocated, and the processor utilization of the processes (e.g., how many processor cycles the processes are using).

Collecting performance-related metrics in relation to the processes that constitute a workload in particular is a type of action that may have to be performed within the kernel space 202. Therefore, in an embodiment of the invention, the workload management software 206 sends a request for such performance-related metrics as to a given workload as a whole and as identified by the workload identifier 214 across the kernel space 202-user space 204 boundary to the workload management daemon 208. In response, the workload management daemon 208 steps through each entry 212 of the array 210 associated with the workload in question having the workload identifier 214, and collects the performance-related metrics for each process constituting this workload. These performance-related metrics for all the processes constituting the workload are aggregated, and sent to the workload management software 206 by the workload management daemon 208 across the kernel space 202-user space 204 boundary.

It is noted, therefore, that collecting, aggregating, and reporting performance-related metrics for a workload requires only a single communication across the kernel space 202-user space 204 boundary, when the workload management daemon 208 sends the aggregated metrics to the workload management software 206. This is in contrast to the prior art, in which a computer program may have to send a request across the kernel space 202-user space 204 boundary for each process, and aggregate the resulting performance-related metrics within the user space 204, as opposed to within the kernel space 202 as in embodiments of the invention. As such, embodiments of the invention provide for reduced communications across the kernel space 202-user space 204 boundary, which is advantageous because such cross-boundary communications can be negatively impact performance of the computing environment 100 of FIG. 1 as a whole.

Figure 3:
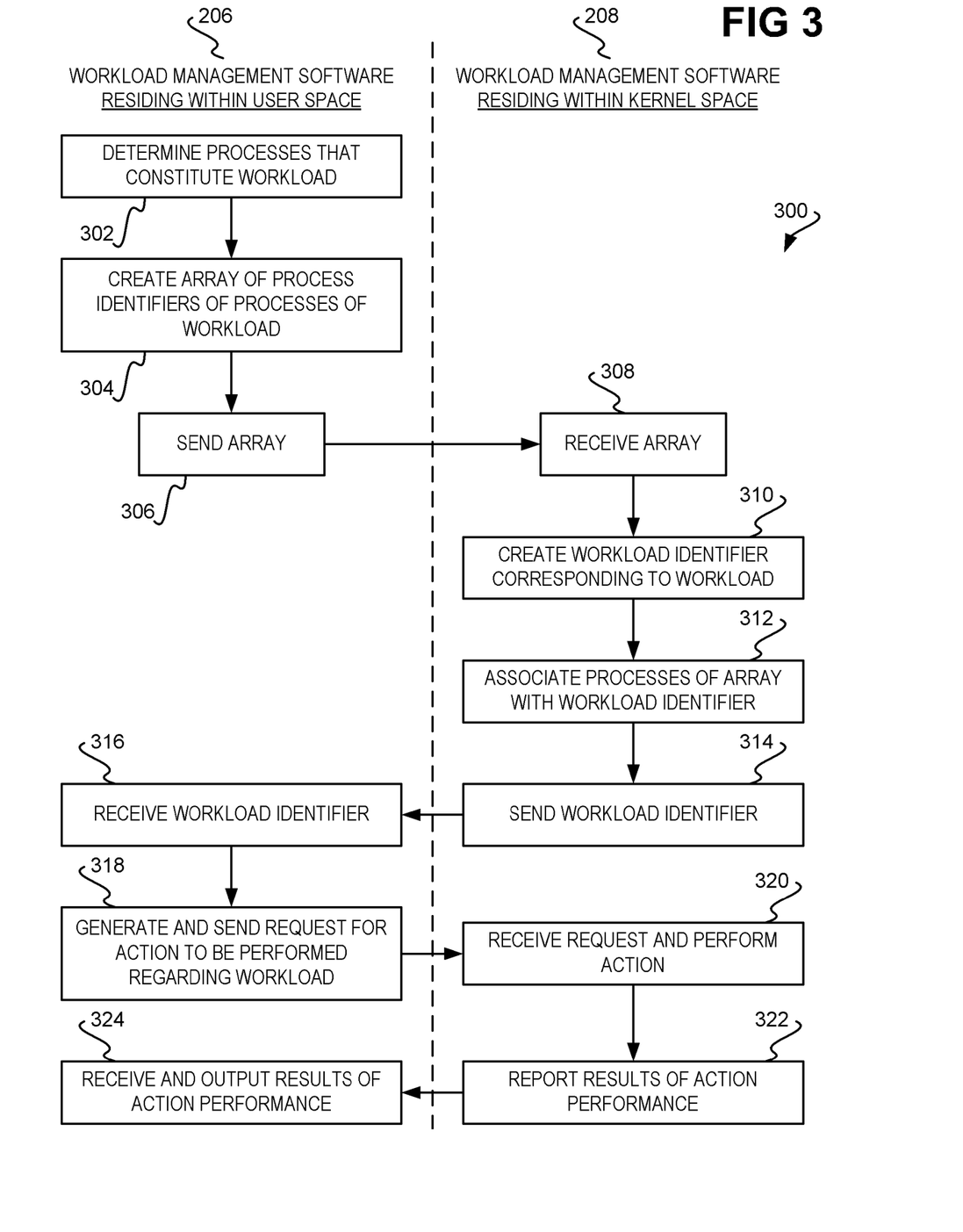
FIG. 3 is a flowchart of a method for managing, controlling, and/or monitoring a workload, according to an embodiment of the present invention.

FIG. 3 shows a method 300, according to an embodiment of the invention. Parts of the method 300 in the left-hand column of FIG. 3 are performed by the workload management software 206 running within the user space 204, whereas parts of the method 300 in the right-hand column of FIG. 3 are performed by the workload management daemon 208 residing within the kernel space 202. As such, the dotted line in FIG. 3 dividing the left-hand column from the right-hand column may be considered the boundary between the user space 204 and the kernel space 202.

The workload management software 206 determines the processes that constitute a desired workload (302). For example, as has been noted, those process that satisfy a predetermined policy may be said to constitute the workload in question. This policy thus defines which processes should be included within the workload. The workload is created dynamically. That is, in addition to selecting the processes that constitute the workload from the processes currently running within the computing environment in question, as new processes are caused to be run within the computing environment, it is (dynamically) determine whether each of these new processes also should be associated with the workload.

The workload management software 206 then desirably creates the array 210 having the entries 212 populated with the process identifiers of the processes of the workload (304), and sends this array across the boundary between the user space 204 and the kernel space 202 to the workload management daemon 208 (306). The workload management daemon 208 receives the array 210 (308), and responsively creates the workload identifier 214 corresponding to the workload defined by the processes denoted by the process identifiers within the entries 212 of the array 210 (310). The workload defined by the processes having the process identifiers within the entries 212 is associated with the workload identifier 214 (312). That is, the processes themselves and/or the array 210 itself is associated with the workload identifier 214.

The workload management daemon 208 desirably sends the workload identifier 214 to the workload management software 206 across the boundary between the kernel space 202 and the user space 204 (314). The workload management software 206 receives the workload identifier 214 (316). Thus, the workload encompassing the processes identified by process identifiers within the entries 212 of the array 210 is able to be commonly identified by the workload management software 206 and the workload management daemon 208 via the workload identifier 214 for this workload.

At some point, the workload management software 206 may generate and send a request for a management-, control-, monitoring-related, and/or another type of action to be performed regarding the workload (318). Such a request may be initiated by a user interacting with the workload management software 206, for instance. The request is communicated from the workload management software 206 over the boundary between the kernel space 202 and the user space 204. The request includes information regarding the type of action to be performed in relation to the workload in question, as well as the workload identifier 214 of this workload.

The workload management daemon 208 receives the request and responsively performs the requested action in relation to the workload identified by the workload identifier 214 received as part of the request (320). The workload management daemon 208 performs the action as to each process of the workload. Because the workload identifier 214 of this workload is associated with the array 210 that the workload management daemon 208 earlier received, the daemon 208 may successively step through the entries 212 of the array 210 and perform the requested action in relation to each process having a process identifier within one of the entries 212.

Once the requested action has been performed, the workload management daemon 208 may report the results of the performance of the action to the workload management software 206 over the boundary between the kernel space 202 and the user space 204 (322). The workload management software 206 receives these results, and may output them for the benefit of the user interacting with the software 206 (324). For instance, the results may be displayed on a display device associated with the computing environment in question, for viewing by the user, and/or may be printing using a printing device associated with the computing environment, also for viewing by the user.

Figure 4:
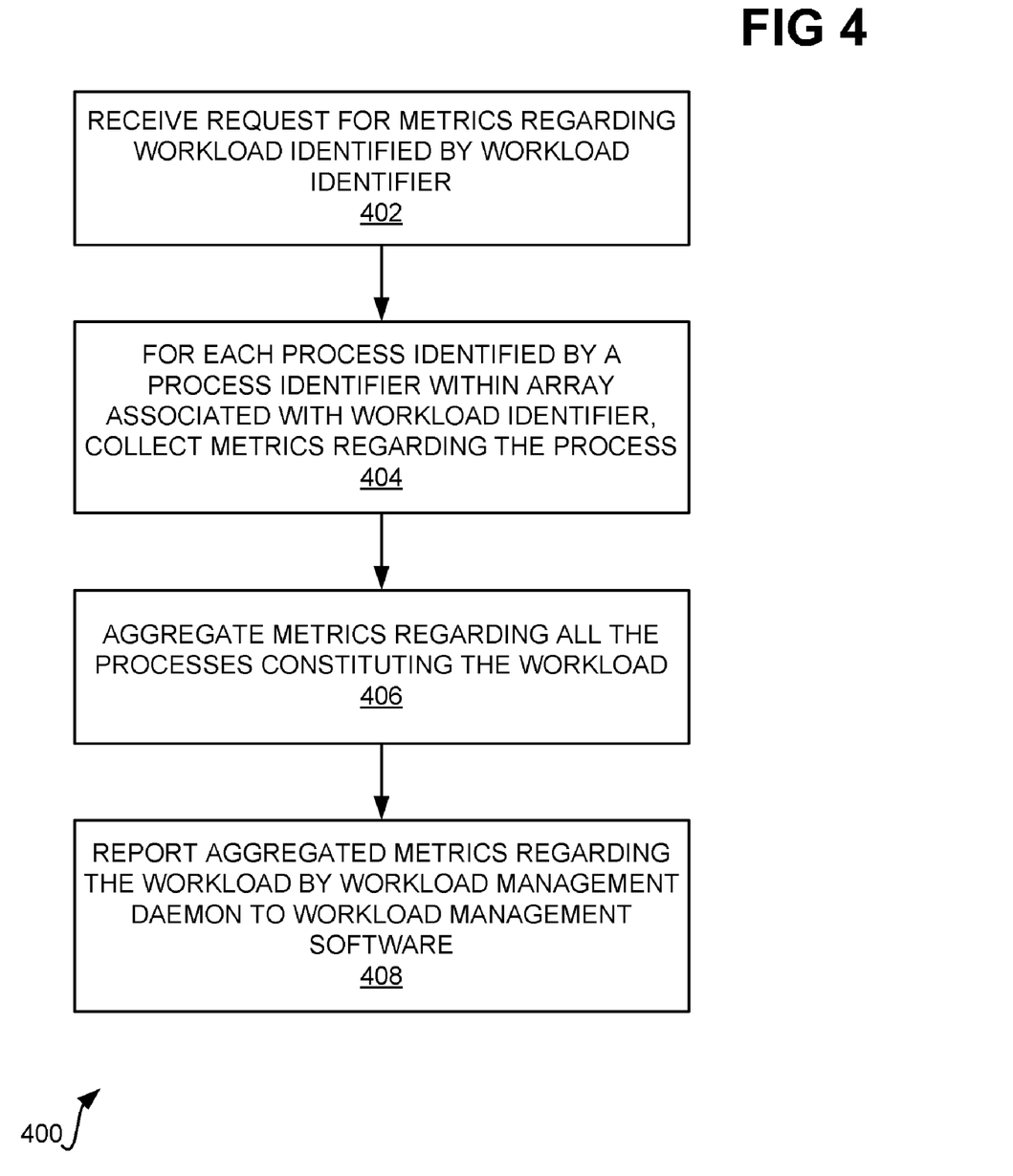
FIG. 4 is a flowchart of a method for specifically acquiring workload metrics, and which may be performed in conjunction with the method of FIG. 3, according to an embodiment of the present invention.

FIG. 4 shows a method 400 for collecting, aggregating, and reporting performance-related metrics regarding a workload, according to an embodiment of the invention. The method 400 may be considered as an exemplary embodiment of parts 320 and 322 of the method 300 of FIG. 3. As such, the method 400 is performed by the workload management daemon 208 in one embodiment of the invention.

The workload management daemon 208 receives a request for performance-related metrics regarding a workload identified by the workload identifier 214 (402). In response, for each process identified by a process identifier within an entry 212 of the array 210, the workload management daemon 208 collects the desired metrics regarding the process (404). Such metrics can include memory utilization and/or processor utilization, as well as other performance-related metrics and other types of metrics, as has been noted above.

Once the metrics have been obtained for each process constituting the workload, the metrics of all the processes are aggregated in some way to yield the aggregated metrics for the workload itself (406). Aggregation can be performed by adding, averaging, or performing other mathematical operations and/or other types of operations in relation to the set of all the metrics for all the processes. Once the metrics for the workload has been calculated, they are reported by the workload management daemon 208 to the workload management software 206 across the boundary between the kernel space 202 and the user space 204 (408).

The workload management software 206 can thus output the aggregated metrics for the workload as a whole, as has been described in relation to part 324 of the method 300 of FIG. 3. It is noted that in the metric collection, aggregation, and reporting process of parts 404, 406, and 408 of the method 400, the boundary between the kernel space 202 and the user space 204 is conversed just once, during the actual reporting to the workload management software 206 in part 408. This reduced communication across the kernel space 202-user space 204 is advantageous, as has been discussed above.

It is noted that the processes that constitute a workload can be dynamically selected at any time. For instance, when a workload is first created, the processes that constitute the workload may be selected from the processes currently being executed, based on a predetermined policy. Thereafter, as new processes are caused to be executed, they may be added to the existing workload if the new processes also satisfy predetermined policy.

Furthermore, the processes that constitute a workload can be defined across boundaries of preexisting collections of processes. For example, some of the processes of a given workload may be associated with one computer program, and other of the processes of the given workload may be associated with another computer program. That is, some of the processes constituting a workload may be grouped in a different container than the container in which other of the processes constituting the workload may be grouped. The processes constituting a workload, in other words, may be wholly or in part unrelated to one another, but for their constitution of the workload.

In addition, insofar as the second computer program runs in kernel memory space, performing management, control, and monitoring-related actions can be performed efficiently and without unduly taxing resources of the computing environment. For example, it may be desired that performance-related or other types of metrics be obtained for the workload as a whole. As such, the first computer program running in user memory space sends a request to obtain such metrics to the second computer program running in kernel memory space. The second computer program obtains and aggregates these metrics for the processes that make up the workload in question, and reports the metrics back to the first computer program.

Therefore, the metrics collection and reporting process requires only a single communication across the user memory space-kernel memory space boundary: when the second computer program reports back the metrics for the workload as a whole to the first computer program. This is in contradistinction to the prior art, where metrics collection and reporting requires a communication across the user memory space-kernel memory space boundary for each process of the workload. By assigning such metrics collection to a computer program residing in kernel memory space (the second computer program in particular), the number of communications across the user memory space-kernel memory space boundary is decreased, which improves performance.

It is further and finally noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:
receiving specification of a plurality of processes, including one or more first processes encompassed by a first container strictly defined in relation to and corresponding to a first target computer program and one or more second processes encompassed by a second container strictly defined in relation to and corresponding to a second target computer program, such that the first container isolates the first processes associated with the first target computer program from the second processes associated with the second target computer program and the second container isolates the second processes associated with the second target computer program from the first processes associated with the first computer program;
defining, by a first computer program running in user space of a computing environment, a workload as at least a sub-plurality of the processes, including selecting at least one of the first processes of the first container and selecting at least one of the second processes of the second container to define the workload across boundaries of the first container and of the second container, where at least one of the processes of the workload is unrelated to at least one other of the processes of the workload;
creating a workload identifier corresponding to the workload, by a second computer program running in kernel memory space of the computing environment;
associating the processes with the workload identifier, by the second computer program;
in response to a request by the first computer program for metrics regarding the workload,
collecting the metrics regarding the workload by collecting metrics regarding the processes that constitute the workload and that are associated with the workload identifier, by the second computer program; and
reporting the metrics regarding the workload from the second computer program to the first computer program.

2. The method of claim 1, further comprising outputting the metrics regarding the workload by the first computer program, by one or more of:
displaying the metrics on a display device associated with the computing environment, for viewing by a user; and
printing the metrics using a printing device associated with the computing environment, for viewing by the user.

3. The method of claim 1, wherein determining the processes that constitute the workload comprises determining the processes that constitute the workload based on a policy that defines which processes should be included within the workload.

4. The method of claim 1, further comprising creating an array of process identifiers by the first computer program, each process identifier corresponding to one of the processes.

5. The method of claim 4, wherein collecting the metrics regarding the workload comprises:
for each process identifier within the array, collecting metrics regarding the process to which the process identifier corresponds, by the second computer program; and
aggregating the metrics regarding each process to result in the metrics regarding the workload.

6. The method of claim 1, wherein determining the processes that constitute the workload comprises selecting the processes from a plurality of processes currently running within the computing environment.

7. The method of claim 6, wherein determining the processes that constitute the workload further comprises, as new processes are caused to be run within the computing environment, dynamically determining whether each new process is to be associated with the workload.

8. The method of claim 1, wherein collecting the metrics regarding the workload and reporting the metrics regarding the workload requires only a single communication across a boundary between the kernel memory space and the user memory space of the computing environment, the single communication including reporting of the metrics from the second computer program running in the kernel memory space to the first computer program running in the user memory space.

9. The method of claim 1, wherein the request by the first computer program for the metrics regarding the workload is a first request, the method further comprising:
in response to a second request by the first computer program to perform an action regarding the workload,
performing the action in relation to each process of the processes that constitute the workload and that is associated with the workload identifier by the second computer program.

10. A computing system comprising:
one or more processors;
memory divided into user memory space and kernel memory space;
a first target computer program including one or more first processes executed by the processors, the first processes encompassed by a first container strictly defined in relation to and corresponding to the first target computer program;
a second target computer program including one or more second processes executed by the processors, the second processes encompassed by a second container strictly defined in relation to and corresponding to the second computer program, such that the first container isolates the first processes associated with the first target computer program from the second processes associated with the second target computer program and the second container isolates the second processes associated with the second target computer program from the first processes associated with the first computer program;
a first computer program running in the user memory space to receive specification of the processes, and to define a workload as at least a sub-plurality of the processes by selecting at least one of the first processes and selecting at least one of the second processes to define the workload across boundaries of the first container and of the second container, where at least one of the processes of the workload is unrelated to at least one other of the processes of the workload; and
a second computer program running in the kernel memory space to perform actions in relation to the processes that constitute the workload in response to requests from the first computer program.

11. The computing system of claim 10, wherein the first computer program is to create an array of process identifiers, each process identifier corresponding to one of the processes, and is to pass the array to the second computer program, in response to which the second computer program is to create a workload identifier corresponding to the workload.

12. The computing system of claim 10, wherein the first computer program is to select the processes that constitute the workload from a plurality of processes currently being executed by the processors, as well as dynamically from new processes that are subsequently executed by the processors as the new processors are executed by the processors and after the workload has been initially created.

13. The computing system of claim 10, wherein the actions comprise collecting metrics regarding the workload, such that in response to the first computer program requesting that the metrics regarding the workload be collected, the second computer program is to collect and aggregate metrics regarding each process that constitutes the workload to result in the metrics regarding the workload and is to report the metrics regarding the workload back to the first computer program.

14. The computing system of claim 13, wherein collecting, aggregating, and reporting the metrics regarding the workload by the second computer program requires only a single communication across a boundary between the kernel memory space and the user memory space, the single communication being reporting of the metrics from the second computer program to the first computer program.

15. The computing system of claim 10, wherein the actions comprise performing a control or management-related action regarding the workload, such that in response to the first computer program requesting that the control or management-related action regarding the workload be performed, the second computer program is to perform the control or management-related action in relation to each process constituting the workload.

16. The computing system of claim 10, wherein the first computer program comprises workload manager daemon software running in the kernel memory space, and the second computer program comprises workload manager software running in the user memory space.

17. An article of manufacture comprising:
a non-transitory tangible computer-readable medium; and
means in the medium for performing a method comprising:
starting a first computer program in user memory space of a computing environment;
starting a second computer program in kernel memory space of the computing environment;
receiving specification of a plurality of processes, including one or more first processes encompassed by a first container strictly defined in relation to and corresponding to a first target computer program and one or more second processes encompassed by a second container strictly defined in relation to and corresponding to a second target computer program, such that the first container isolates the first processes associated with the first target computer program from the second processes associated with the second target computer program and the second container isolates the second processes associated with the second target computer program from the first processes associated with the first computer program;
defining, by the first computer program, a workload as at least a sub-plurality of the processes, including selecting at least one of the first processes of the first container and selecting at least one of the second processes of the second container to define the workload across boundaries of the first container and of the second container, where at least one of the processes of the workload is unrelated to at least one other of the processes of the workload;
for each process, sending a process identifier associated with the process from the first computer program to the second computer program; and
creating a workload identifier corresponding to the workload and associating the process identifiers of the processes with the workload identifier, by the second computer program.

* * * * *